May 9, 1939.  C. A. BREWER  2,157,588
CONTROL SYSTEM FOR MOTOR VEHICLES
Filed Sept. 17, 1934  3 Sheets-Sheet 1
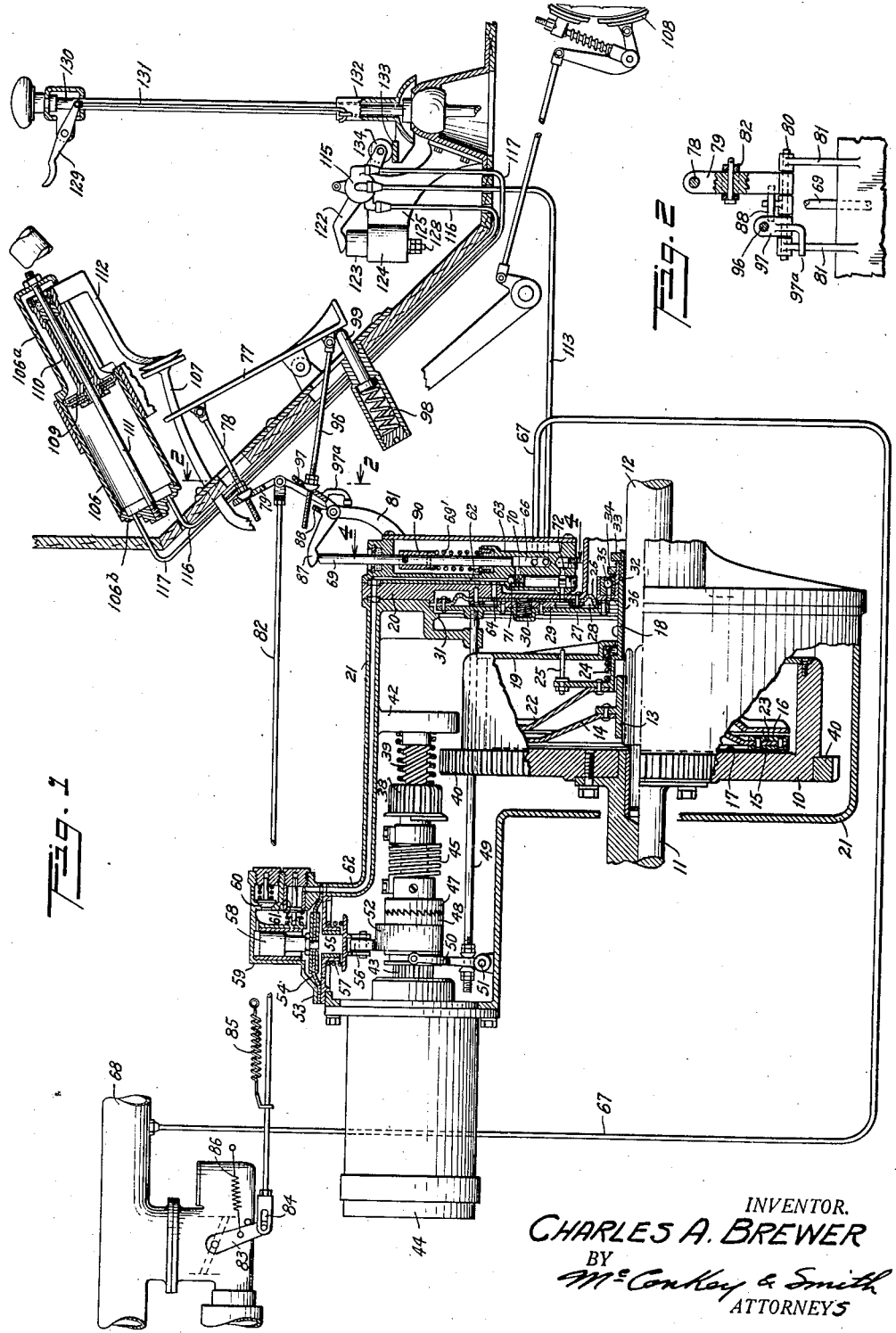
INVENTOR.
CHARLES A. BREWER
BY McConkey & Smith
ATTORNEYS May 9, 1939.  C. A. BREWER  2,157,588
CONTROL SYSTEM FOR MOTOR VEHICLES
Filed Sept. 17, 1934   3 Sheets-Sheet 2

INVENTOR.
CHARLES A. BREWER
BY
McConkey & Smith
ATTORNEYS

May 9, 1939.   C. A. BREWER   2,157,588
CONTROL SYSTEM FOR MOTOR VEHICLES
Filed Sept. 17, 1934   3 Sheets-Sheet 3
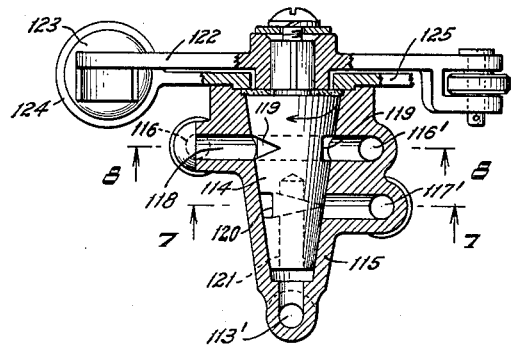
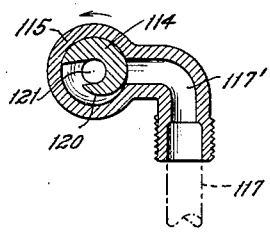
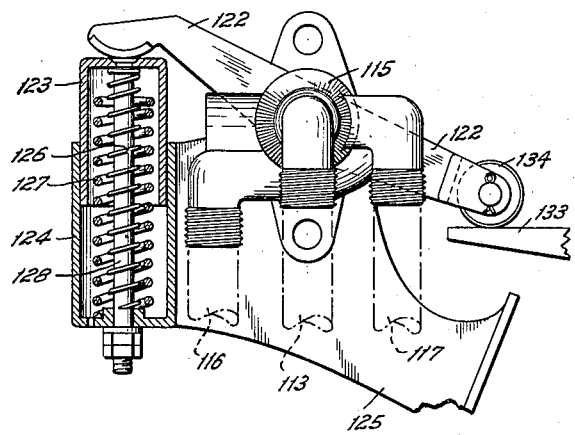
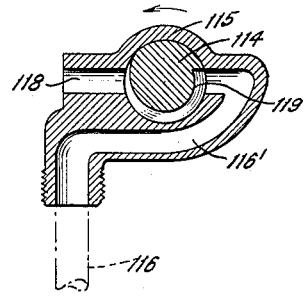
INVENTOR.
CHARLES A. BREWER
BY
ATTORNEYS Patented May 9, 1939

2,157,588

UNITED STATES PATENT OFFICE 2,157,588

CONTROL SYSTEM FOR MOTOR VEHICLES

Charles A. Brewer, Noroton Heights, Conn., assignor of one-half to Philip J. Kury, Arverne, N. Y.

Application September 17, 1934, Serial No. 744,281

18 Claims. (Cl. 192—.01)

This invention relates to control mechanism for motor vehicles and more particularly to the combination of clutch and brake mechanism and pressure differential operated means for controlling the same.

It has been heretofore proposed to operate the clutch mechanism of motor vehicles by power means, but because of the travel of the clutch and clutch operating parts from full disengaged position to the point of engagement of the clutch surfaces, it has been found necessary in practice to provide at least two stages of movement in the power actuating device in order to obtain operation simulating manual actuation. Accordingly, one of the objects of the present invention is to provide novel clutch mechanism wherein the movement of the operating parts is reduced to a minimum, thereby eliminating the necessity for two-stage operation of the power actuator.

Another object of this invention is to provide novel differential pressure operated means for actuating the clutch mechanism of a motor vehicle.

Still another object of the invention is to provide novel means for controlling the operation of power means adapted to actuate a clutch mechanism.

A further object is to provide novel means for controlling the speed of engagement of a power actuated clutch mechanism whereby smooth, yet prompt, engagement is obtained.

A still further object is to provide novel clutch mechanism and control means therefor which embody but a small number of compactly arranged parts of simplified design, the movement of said parts being reduced to a minimum and to straight line movement.

Another object is to provide a novel combination of clutch mechanism and power actuating means therefor.

A further object is to provide novel clutch control mechanism whereby the clutch is automatically disengaged before the starting mechanism becomes effective to crank the engine.

Another object is to provide a novel control system for the brake and clutch mechanisms of a motor vehicle.

Still another object is to provide novel means for controlling the power actuation of the brakes of a vehicle whereby too sudden application of the brakes is prohibited.

Another object is to provide a novel control system for a motor vehicle wherein both the clutch and brakes may be power operated, thereby simplifying the control of the vehicle.

The above and further objects and novel features will more fully appear from the following detailed description taken in connection with the accompanying drawings. It is to be expressly understood, however, that the drawings are for the purpose of illustration only and are not designed as a definition of the limits of the invention, reference being primarily had for this purpose to the appended claims.

In the drawings, wherein like reference characters refer to like parts throughout the several views:

Fig. 1 is a side elevation, partly in section and with parts broken away, of one form of the novel control system comprehended by this invention;

Fig. 2 is a detail view, partly in section and with parts broken away, taken on line 2—2 of Fig. 1;

Figs. 5 and 6 are top plan and side elevation, respectively, partly in section and with parts broken away, of one form of valve mechanism that may be employed in carrying out the invention;

Fig. 7 is a sectional view taken on line 7—7 of Fig. 5; and

Fig. 8 is a sectional view taken on line 8—8 of Fig. 5.

Figures 3, 4:
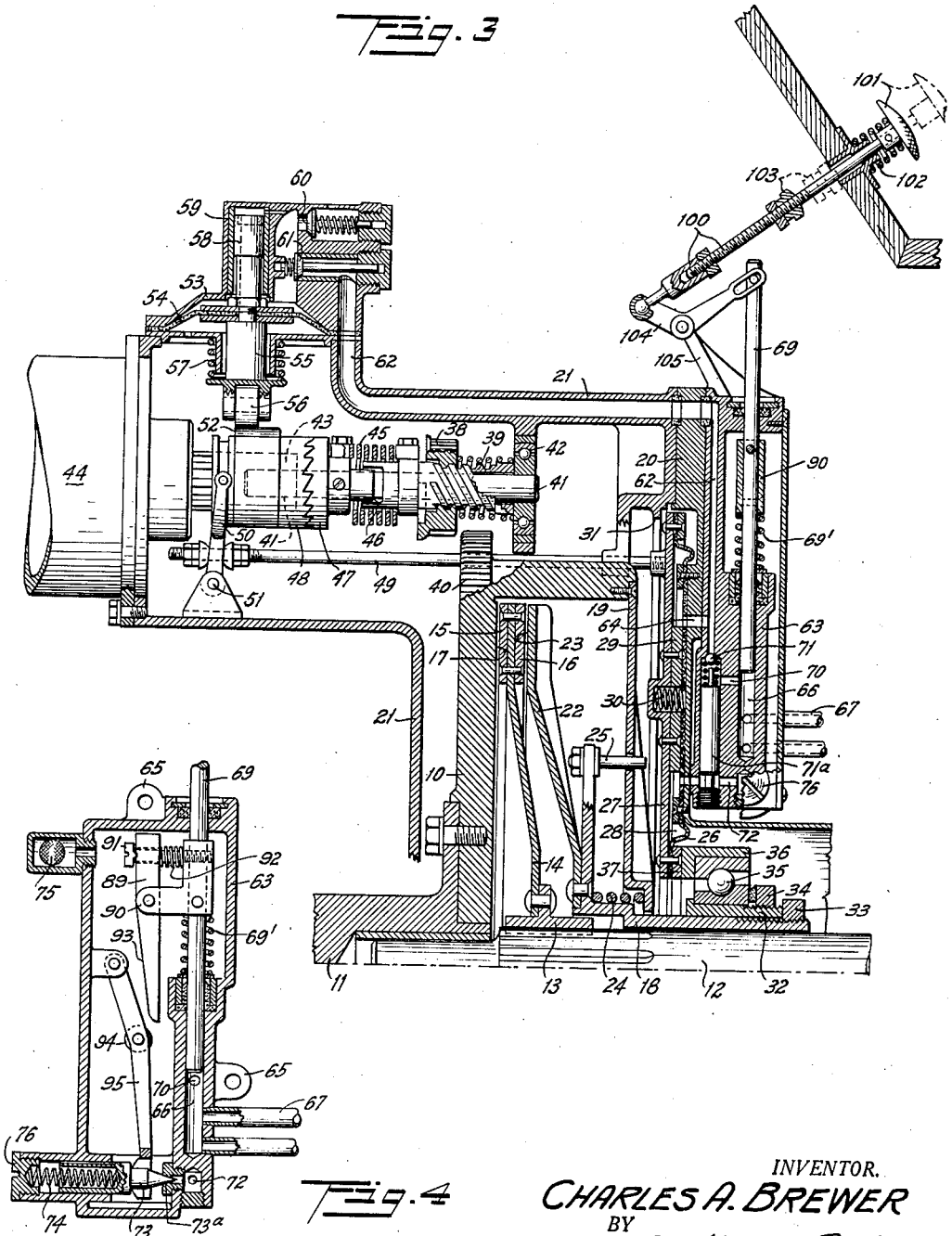
Fig. 3 is a side elevation, partly in section and with parts broken away, of clutch and clutch control means of the system shown in Fig. 1, with slight modifications and on an enlarged scale.
Fig. 4 is a detail view, partly in section and with parts broken away, of a portion of the novel control means constituting a part of the invention, the same being taken substantially on line 4—4 of Fig. 1.

The present invention, as illustrated in Figs. 1 and 3, comprehends the provision of a novel combination of clutch mechanism and power operating means, whereby the movement of the driving surfaces of the clutch from full disengaged to engaged position is reduced to a minimum, the parts thereof being of simplified construction and adapted to be installed within the flywheel housing. In the form shown, said clutch mechanism is mounted within the hollowed out portion of a flywheel 10 drivably secured to the outer end of an engine drive shaft 11, the latter being adapted to be connected by the novel clutch mechanism to a driven shaft 12 journaled at one end in shaft 11 and extending rearwardly to the transmission (not shown).

Mounted on shaft 12, by means of longitudinal splines and adjacent flywheel 10, is a flanged sleeve 13, to which is secured a clutch disc 14.

The latter is provided on each side and at the periphery thereof with friction rings 15 and 16, the former of which is adapted to engage a friction surface 17 on the flywheel to thereby transmit power from shaft 11 to shaft 12.

Means for moving and holding surfaces 15 and 17 in operative engagement are constituted by a flanged sleeve 18 loosely mounted on shaft 12 for both rotary and longitudinal movement thereon, said sleeve extending outwardly from flywheel 10 through a plate or cover 19 on the latter and through a cover 20 on flywheel casing 21. Secured to the inner end of sleeve 18 is a pressure disc 22 similar to disc 14 and provided with a friction surface 23 adapted to engage friction member 16. Any suitable yielding means may be provided for normally holding surfaces 15, 17 and 16, 23 in operative engagement. As shown, such yielding means are constituted by a heavy coil spring 24 interposed between a flange on sleeve 18 and the inner surface of flywheel cover 19. To prevent relative rotation between disc 22 and flywheel 10 when the clutch is disengaged, a pin 25 rigidly secured to the flange of sleeve 18 projects rearwardly through cover 19.

Novel means, actuated by the vacuum in the engine manifold, are provided for actuating the above described clutch mechanism to release the same against the pressure of spring 24, which means are simple and compact and adapted to be mounted adjacent the clutch, thereby eliminating the linkages heretofore employed and substituting a fewer number of parts having a straight line movement. Furthermore, the power device is operatively associated with the clutch in such a manner as to avoid the necessity for two or more stages of movement of said power device to obtain smooth and proper clutch engagement. In the illustrated embodiment, the novel power device comprises a ring shaped, flexible diaphragm 26 surrounding shaft 12 and secured in a fluid tight manner to the inner surface of flywheel housing cover 20.

The outer edges of diaphragm 26 are secured to a plate or ring 27 having a somewhat smaller radial thickness than the diaphragm, whereby an expansible annular chamber 28 is formed. The engine manifold vacuum is preferably employed to exhaust air from chamber 28 whereby the volume of the latter is reduced, and plate 27 is moved to actuate the clutch to disengaged position, as illustrated. Preferably, diaphragm 26 extends all the way across chamber 28 to form a cushion or silencer for plate 27 when suction is admitted to said chamber through novel control means to be hereinafter described. A ring or annular pad 29 may be secured near the center of plate 27 as additional cushioning means therefor. For the purpose of expanding chamber 28 when the same is opened to atmosphere, a plurality of springs 30 are circumferentially disposed between members 26 and 27. The movement of plate 27 to the left (Fig. 3) by springs 30 is limited by an annular stop 31, said movement being kept as small as possible, consistent with obtaining complete disengagement of the clutch. By keeping the volume of chamber 28 as small as possible, when the same is fully expanded, there is a conservation of power and the action of the device is more prompt.

In order to transmit motion from the above described fluid pressure responsive power unit to move pressure disc 22 out of engagement with clutch disc 14 just far enough to prevent any dragging of the clutch surfaces, a sleeve 32 is adjustably mounted, as by means of screw threads, on sleeve 18 and held in place thereon by a lock nut 33. Supported on sleeve 32 and held in place thereon by a nut 34 is a ball-thrust bearing 35. A flanged ring 36 is pressed onto the outer race of said bearing and is adapted to be engaged by plate 27 through the medium of a ring 37 adjacent the periphery of the central opening in said plate. Thus, movement of the latter to the right (Fig. 3) will result in movement of pressure disc 22 to the right. The range of movement of plate 27 is constant, the same being determined by member 26 and stop 31, whereas the extent of movement of disc 22 is adjustable by means of threaded sleeve 32.

A very fine adjustment is thus provided whereby the disengaging movement of the clutch surfaces is reduced to a minimum, disc 14 and its associated friction rings 15 and 16 assuming a floating position, as shown, during disengagement. The clutch surfaces being thus retained very near the point of driving engagement, only a small, uniform movement is required in the power actuating device 26, 27 to obtain proper clutch engagement.

Novel means are also provided in combination with the engine cranking means for actuating power unit 26, 27 to disengage the clutch before the engine is cranked. The load on the starting motor is thus decreased and starting is rendered easier, particularly during cold weather. Additionally, the danger attendant to actuating the starter when the vehicle is in gear is completely eliminated. In the embodiment illustrated, the starting mechanism includes a "Bendix" drive, the pinion 38 of which is threadedly mounted on a sleeve 39 and adapted to move in and out of engagement with a gear 40 on the periphery of flywheel 10. Sleeve 39 is slidably mounted on a shaft 41 rotatably supported at one end by a bearing 42 and journaled at its other end in a recess in the armature shaft 43 of an electric starting motor 44. Sleeve 39 is drivably connected to shaft 41 for rotation therewith by means of a coil spring 45 and a bayonet joint 46, the latter being for the purpose of limiting the relative rotational movement of said shaft and sleeve.

Rigidly secured to the forward end of shaft 41 is a suitable clutch member such as jaw clutch member 47 adapted to be engaged by a similar clutch member 48 which is mounted on armature shaft 43 for rotation therewith and longitudinal movement relative thereto by means of splines. Clutch 47, 48 thus constitutes a breakable driving connection between motor 44 and shaft 41 of the "Bendix" drive.

Means are provided whereby clutch 47, 48 is disengaged whenever the main vehicle clutch 15, 17 is engaged, thus making it impossible to establish a driving connection between starting motor 44 and flywheel 10 when said main clutch is in engagement. Such means, in the form shown, are constituted by a motion multiplying linkage comprising a rod 49 rigidly secured at one end to a radially extending lug on plate 27 and adjustably connected adjacent its other end to a yoke 50, pivoted at 51, and adapted to engage a trunnion collar on member 48. The connection between said rod and yoke is at such a point relative to pivot 51 that a small movement of plate 27 will result in an increased movement of member 48 longitudinally of shaft 43. Thus, when plate 27 is against stop 31, clutch 47, 48 will be disengaged.

Since, as will appear hereafter, fluid pressure motor 26, 27 is open to atmosphere when the vehicle motor is not operating, novel means are provided for energizing said motor to disengage the main clutch and engage clutch 47, 48 before a starting connection is established. As shown, such means are constituted by a suction pump secured to flywheel housing 21 and adapted to be actuated by a cam 52 formed on clutch member 48. The pump comprises a cylinder or housing 53 in which a diaphragm 54, constituting plunger means, is operative. A guide rod 55 is rigidly connected to the lower face of diaphragm 54 and is provided at its lower end with a roller 56 adapted to be held in engagement with cam 52 by a spring 57 interposed between the lower end of cylinder 53 and a flange on rod 55. A guide rod 58 is also secured to the upper face of diaphragm 54 and operates in a guide 59. The expansible chamber above said diaphragm communicates with atmosphere through a one-way, spring-pressed valve 60 and with fluid pressure motor 26, 27 through an oppositely opening one-way valve 61, the latter valve controlling a conduit 62 bored in casing 21 and a valve housing 63. Conduit 62 is in constant communication with chamber 28 through a hole 64 in cover 20.

When, therefore, starting motor 44 is energized, pump 53, 54 is first effective to evacuate chamber 28, and atmospheric pressure acting on the left or outer face of plate 27 moves the same to the right to disengage main clutch 15, 17 and engage clutch 47, 48. Shaft 41 and sleeve 39 are thus started rotating. Pinion 38, due to its inertia, resists rotation and is accordingly threaded into engagement with gear 40 to complete the driving connection between starting motor 44 and crankshaft 11.

Novel means are provided for controlling the operation of the power clutch actuator when the vehicle engine is in operation, and in the embodiment shown in Fig. 1, such means are in turn controllable by the accelerator pedal. In the form shown, said control means comprise a valve casing 63 secured by means of lugs 65 (Fig. 4) to flywheel housing cover 20. Said casing is provided with a cylindrical valve chamber 66 connected by means of a conduit 67 to a source of sub-atmospheric pressure such as the intake manifold 68 (Fig. 1) of the vehicle engine, said connection being adapted to be controlled by a valve rod 69 reciprocable in said valve chamber, and normally held in raised position by a spring 69'. At a point above the entrance of conduit 67 into chamber 66 is a passage 70, through which said chamber is adapted to communicate with conduit 62 and hence with chamber 28 of power device 26, 27. A ball check valve 71 is provided in passage 70. When valve rod 69 is in the position shown, i. e., at the top of its stroke, chamber 28 is evacuated by the suction from manifold 68 and clutch 15, 17 is disengaged. Check valve 71 is provided to prevent the suction of air from manifold 68 by pump 53, 54 when the vehicle engine is being started. Said check valve with its spring is adjustably supported on a plug 71a threaded into a passage bored in housing 63, said passage being an enlarged continuation of conduit 62.

When it is desired to engage the main clutch to drivably connect shafts 11 and 12, it is only necessary to destroy the vacuum in chamber 28 by the admission of air, under atmospheric pressure, after closing the suction or manifold connection by depressing rod 69 to cut off passage 70.

An atmospheric inlet or bleed, constituted by a passage 72 bored in the lower part of casing 63 and controlled by a needle valve 73 (Fig. 4), is provided for this purpose, said valve being normally held in closed position by a spring 74. Casing 63 is open to atmosphere through a screen covered port 75. The pressure with which spring 74 acts upon valve 73 is rendered adjustable by a threaded plug 76.

As heretofore pointed out, only a small movement of pressure disc 22 is required to move the clutch from disengaged to engaged position and accordingly a single uniform, relatively slow movement of the movable element of the clutch actuator 26, 27 under a given set of operating conditions is sufficient. The rate of movement of said member and hence the speed of clutch engagement must, however, be varied somewhat depending on the speed of the vehicle, the rate of engagement increasing with said speed. Novel means are accordingly provided whereby the effective area of bleed 73a is controllable in accordance with the position of the accelerator pedal and hence to some extent with the speed of the car.

In the illustrated embodiment, said novel control means are constituted by a foot operable pedal 77 pivotally mounted on the toe board of the vehicle and adapted to exert a one-way pressure by means of a push rod 78 on the upper end of a lever 79 which is pivotally mounted on a shaft 80 supported by rigid brackets 81 (Fig. 2). Pivotally secured to lever 79 intermediate its ends is a rod 82 operatively connected to the butterfly valve 83 of a carburetor through a pin and slot, lost motion connection 84. Rod 82 is normally held in retracted position and butterfly valve 83 closed by springs 85 and 86, respectively.

A lever arm 87, also pivotally mounted on shaft 80, engages the top of valve rod 69 and is provided with a lug 88 in the path of lever 79, whereby said rod is moved downwardly when pedal 77 is pivoted in a counterclockwise direction, as seen in Fig. 1. Lost motion connection 84 permits rod 69 to cut off the suction connection to power device 26, 27 by closing passage 70 before butterfly valve 83 is actuated to accelerate the vehicle engine.

The novel means provided for controlling bleed valve 73 are constituted by cam means movable in response to movement of pedal 77. As shown, a cam arm 89 is pivotally mounted on an L shaped bracket 90 secured to rod 69 within casing 63. A screw 91 slidably extends through the upper end of cam member 89 and is threadedly received by bracket 90, the head of said screw constituting an adjustable stop to limit the pivotal movement of said cam arm. A small spring 92, surrounding screw 91, is provided for holding arm 89 against said stop.

A cam surface 93 is provided on the lower end of arm 89 on the same side as stop 91, said surface as shown being constituted by a gradual uniform taper, but any suitable cam surface may be employed. On the downward movement of rod 69, surface 93 engages a roller 94 carried intermediate the ends of a pivoted lever 95, the lower end of which operatively engages needle valve 73. The latter is thus opened to admit air through passage 72 in an amount proportionate to the depression of the accelerator pedal 77, the maximum area of bleed 73a being such, however, as to prevent too rapid engagement of the clutch surfaces if pedal 77 is depressed too rapidly.

If desired, the parts may be so proportioned that the vacuum connection 70 is cut off before valve 73 starts to open, but preferably the vacuum connection is gradually being closed at the same time valve 73 is being opened. The driver will thus be enabled to slip the clutch as is sometimes desirable, the slipping taking place when the suction is just sufficient to remove from chamber 28 the air entering the latter through valve 73.

Whenever pedal 77 is released, rod 69 is raised by spring 69', whereupon valve 73 is moved to closed position and suction inlet 70 is uncovered to admit vacuum to chamber 28 and disengage clutch 15, 17. It is often desirable, however, to have the clutch engaged when the accelerator is released in order that the compression of the engine may be utilized in braking the vehicle. Means are accordingly provided for accomplishing this purpose, and, in the form shown, said means comprise a push rod 96 pivotally secured adjacent the lower end of pedal 77 and slidably extending through an opening in a lever 97, which is pivotally mounted on shaft 80 and adapted to engage lug 88 to actuate arm 87 and rod 69. Rotation of lever 97 in a clockwise direction, as seen in Fig. 1, is limited by a stop 97a carried by said lever and adapted to engage bracket 81. A nut threaded on rod 96 engages lever 97 to move the same against lug 88 when pedal 77 is pivoted clockwise. This latter movement is preferably yieldingly resisted by a spring 98 which acts upon the lower end of a sliding member 99 which is adapted to engage the lower end of pedal 77. Push rod 78 is adapted to slide freely in an opening in lever 79 when the lower end of said pedal is depressed.

Clockwise movement of pedal 77 from the position illustrated is thus effective to close passage 70 and open valve 73, permitting the engagement of clutch surfaces 15, 17. The rate of engagement being controlled by valve 73, 73a, a smooth, uniform engagement without undue strain on the drive shaft and differential may be obtained irrespective of the speed at which the vehicle is moving. If desired, accelerator and clutch control pedal 77 may be mounted for operation by the left foot, thereby leaving the right free for instant manual operation of the brakes at any time.

In another embodiment of the invention (Fig. 3), means are provided for actuating rod 69 independently of the accelerator pedal, whereby the power actuator is manually controlled in a manner simulating the present day manual operation of the clutch with a very small expenditure of energy. In the embodiment illustrated, such means comprise a two-piece, adjustable rod 100 slidably extending through the toe board and provided with a button 101 at the upper end thereof. Said rod is normally held in the dotted line position shown by a spring 102, this position being determined by a stop nut 103 threaded on the rod below the toe board. The lower end of rod 100 is connected through a swivel joint to one end of a bell crank lever 104 which is pivoted on a bracket 105 and operatively connected at its other end to rod 69, whereby depression of button 101 is effective to lift valve rod 69 uncovering vacuum inlet 70. The clutch will be thus disengaged by power means when button 101 is depressed in the same manner as with manually operable clutch pedals now in use.

Likewise, when button 101 is released, rod 69 moves downwardly to gradually close port 70 and gradually open valve 73 through the medium of cam 93. The clutch may thus be slipped in the same manner as pointed out above in the discussion of Fig. 1, affording the operator the same flexibility of control available with full manual operation, while safeguarding against too rapid engagement at any time.

Novel means are provided in combination with, and operable in conjunction with, the above described clutch control means for controlling the brakes of the vehicle, said means being provided with common valve means whereby the power actuator for said brakes is rendered inoperative at any predetermined speed when the vehicle clutch is engaged, the speed being considered a function of the position of the accelerator pedal. In the illustrated embodiment, said novel means comprise a differential pressure operated motor constituted by a cylinder 106 supported by suitable means (not shown) adjacent brake lever 107, the latter being connected in the usual manner to brake 108. A piston 109, operable in said cylinder, is provided with a hollow piston rod 110 and is guided by a rigid guide rod 111 centrally and longitudinally disposed in cylinder 106, said rod serving also as a tie rod for holding cylinder heads 106a and 106b in place. Suitable packing is provided between the guide rod and said piston and piston rod to prevent leakage from the space in cylinder 106 below the piston. An arm 112, secured to the upper end of piston rod 110 and extending through a slot in cylinder head 106a, is adapted to engage the upper surface of brake pedal 107 whereby brake 108 is applied when piston 109 is moved downwardly. Said piston is adapted to be so moved by suction from the intake manifold 68, cylinder 106 being connected therewith through master valve 66, 69, conduit 113, and other novel control means to appear hereafter.

It will thus be seen that when the inlet for either conduit 113 or 67 is covered by valve rod 69, motor 106, 109 will be cut off from its source of power and be rendered inoperative to apply the brakes. Conduit 67, for example, may be led into valve chamber 66 at any desired point, thus predetermining the position of rod 69 and accelerator pedal 77 and hence, under usual operating conditions, the speed of the engine at which motor 106, 109 will be cut off.

Novel means are interposed between valve 66, 69 and cylinder 106 for controlling the pressure in cylinder 106 and hence the movement of piston 109 whereby the brakes may be applied gradually, the degree of application being under the manual control of the driver. Said means, as shown, include a rotary mixing valve 114 mounted in a casing 115 to which are connected conduit 113 and a pair of conduits 116 and 117, the two latter connecting said housing with the lower end of cylinder 106. An atmosphere inlet 118 is also provided in casing 115 in a plane with and opposite to connection 116' for conduit 116. The casing is provided with a conical bore in which valve plug 114 is adapted to be rotated, said plug having a tapered groove 119 on the periphery thereof to vary the communication area between inlets 116' and 118. A second groove 120 tapered oppositely to groove 119 cooperates with inlet 117' to variably connect the same with conduit 113 through a counterbore 121 in the end of plug 114 and an inlet 113' for said conduit. Normally, the atmospheric connections 116' and 118 are in full communication while suction connection through casing 115 is closed, groove 120 being normally out of register with suction passage 117'. Thus, when valve 114 is turned in a counter-clockwise direction, the suction connection 117 to cylinder 106 is gradually opened while the atmosphere connection 116 is gradually closed. Due to the constant mixing of air and vacuum in varying proportions in cylinder 106 up to the point at which groove 119 moves out of register with inlet 118, the driver is enabled to maintain any desired pressure pull on the brakes by merely rotating plug 114.

It is desirable in the power application of the brakes that the driver have some means of feeling the amount of pressure being applied to the brakes in order to obtain a smooth and not too sudden application. Novel means are comprehended by the present invention for this purpose, said means comprising a lever 122 keyed to a journal projecting from one end of plug 114 whereby the latter may be rotated. One end of lever 122 engages the upper closed end of a cup shaped member 123 telescopically received by a similar member 124 formed integrally with a bracket 125 on which valve 114, 115 is rigidly mounted.

A pair of springs 126 and 127, interposed between the closed ends of said cup members, normally hold the latter in extended position to hold lever 122 and valve 114 in position to close the suction and open the atmospheric connection to cylinder 106. Preferably, spring 126 is the longer and lighter of the two springs and is positioned by a centrally disposed rod 128 secured to member 123 and slidably extending through the end of member 124. The extension of said members is limited by a nut threaded on the outer end of rod 128.

Any manual effort to rotate valve 114 therefore first resisted by light spring 126 which simulates the movement normally necessary to take up the slack in the brake hook-up. When lever 122 has been rotated sufficiently to bring member 123 into engagement with spring 127, the vacuum in cylinder 106, as determined by mixing valve 114, will be just sufficient to take up said slack and lightly apply the brakes. Further manual effort to rotate lever 122 will be resisted by both springs 126 and 127, thereby indicating to the operator that the braking surfaces are engaging. Said springs are preferably calibrated so that the resistance offered by the same will be directly proportional to the pressure being applied to the brakes by fluid pressure motor 106, 109, thus affording an indication to the driver of the braking effort and avoiding a too sudden application of the brakes.

Preferably, means are provided on the gear shift lever of the vehicle for operating lever 122 and hence valve 114. As shown, a trigger or lever 129 is pivotally mounted on a bracket adjacent the upper end of gear shift lever 130. A rod 131 connects the inner end of trigger 129 to a sleeve 132 surrounding the lower end of lever 130 and slidable thereon, said sleeve having a bracket with a horizontal plate 133 formed integrally therewith. Said plate is engaged by a roller 134 carried on one end of valve lever 122. Thus when the outer end of lever 129 is depressed by the operator, plate 133 is raised, rotating lever 122 and valve 114 in a counter-clockwise direction, whereby motor 106, 109 is energized to apply the brakes in the manner above described.

In operation, when accelerator pedal 77 is released, suction from manifold 68 is admitted through valve 66, 69 and ports 70 and 64 to fluid pressure motor 26, 27. Chamber 28 is thus evacuated, plate 27 moving to the right (Fig. 1) into engagement with ring 36, whereupon disc 22 is also moved to the right just enough to permit disengagement of clutch surfaces 15, 17. When the accelerator is depressed, the suction connection is cut off by closure of port 70 and atmosphere is admitted through needle valve 73, 72a, thus permitting spring 24 to again move the clutch surfaces into driving engagement. The speed of the parts into engagement is determined by the degree of opening of valve 73 which is controlled by cam member 93, the latter being movable by accelerator pedal 77. If the engine is stopped, and the source of vacuum for motor 26, 27 thus destroyed, the clutch may be disengaged by closing the circuit to starting motor 44. The latter operates suction pump 53, 54 which is effective to evacuate chamber 28, moving plate 27 to disengage clutch 15, 17 and to engage clutch 47, 48, thus establishing a driving connection between said starting motor and the "Bendix" drive for cranking the engine. Once the engine is again started, suction from manifold 68 becomes effective to hold the clutch in disengaged position until pedal 77 is depressed. To apply the brakes, it is only necessary to depress finger lever 129 on the gear shift lever. If it is desired to employ the compression of the vehicle engine as braking means, the lower end of pedal 77 is depressed, thus cutting off the suction and admitting atmosphere to chamber 28 in the same manner as above described, whereupon spring 24 moves clutch 15, 17 into engagement without cutting off the suction connection to brake operating motor 106, 109.

It will be noted that since cylinder 106 is normally open to atmosphere through conduit 115 and valve 114, the brakes may be applied at will by manually depressing pedal 107 in the usual manner, piston 109 being free to move downwardly therewith.

There is thus provided a novel control system for a motor vehicle wherein novel clutch mechanism and clutch operating means are provided, in combination with novel brake applying apparatus, whereby the operation of the vehicle is rendered much easier and safer and the physical effort of the driver is materially reduced, particularly in heavy traffic. Furthermore, the construction as well as the operation of the clutch means has been greatly simplified, the same comprising a fewer number of more compactly arranged parts, whereby smoother and quicker clutch engagement and disengagement are obtained. There is also provided novel simplified control means for a power brake actuator wherein the physical effort applied to said control means is proportional but considerably less than the corresponding pressure being applied to the brakes. Additionally, novel means are provided whereby the clutch is disengaged when the starting apparatus is in operation, thus protecting said apparatus against damage if the switch is accidentally closed while the vehicle is in gear. The load on the starting motor is also reduced, thereby conserving the energy of the same and making starting surer and easier. Broadly, a novel control system is provided wherein power means for actuating the clutch and brake mechanisms of a vehicle are controllable in a manner simulating proper manual operation with greatly reduced effort on behalf of the driver.

Although only two embodiments of the invention are illustrated and described, it is to be expressly understood that the same is not limited thereto, but that various changes may be made, such as in the design and arrangement of parts illustrated, as will now be apparent to those skilled in the art, without departing from the spirit and scope of the invention, and reference will be had primarily to the appended claims for a definition of the limits of the invention.

What is claimed is:

1. In an automotive vehicle provided with a clutch and means for cranking the engine, power means operably connected to the clutch, and means, interconnecting the power means and cranking means, for rendering the power means operable to effect a disengagement of the clutch prior to the operation of the cranking means to crank the engine.

2. In an automotive vehicle provided with power means for cranking the engine and a clutch, power means for operating the clutch, and means operated by the cranking means and operative to energize the clutch operating power means to disengage the clutch.

3. In an automotive vehicle provided with power means for cranking the engine and a clutch, pressure differential operated power means for operating the clutch, and means operated by the cranking means and operative to energize the clutch operating power means to disengage the clutch, said third mentioned means comprising a vacuum pump operable by the power means for cranking the engine.

4. In a motor vehicle having an engine, a clutch to control transmission of power from the engine, means for cranking the engine, a pressure differential operated motor comprising an interconnected plate and diaphragm, means interconnecting said plate and clutch, resilient means urging said plate in one direction to engage the clutch, pumping means operated by said cranking means and communicating with said motor to evacuate and thus energize the latter to disengage the clutch.

5. In a motor vehicle having an engine, a clutch to control the transmission of power from the engine, means to crank the engine, and means associated with a portion of said cranking means to disengage the clutch, said cranking means being operative to crank the engine upon the disengagement of the clutch.

6. In apparatus of the class described, a driving clutch member, a driven clutch member, yielding means for normally holding said clutch members in driving engagement with each other, and an annular, non-rotatable power device coaxially disposed with respect to said clutch members for disengaging the same.

7. In a motor vehicle, an engine, an accelerator for controlling said engine, clutch means, a differential fluid pressure motor for actuating said clutch means, valve means operable by said accelerator for controlling the pressure in said motor whereby said clutch means are normally disengaged when the accelerator is released, and means operative by said accelerator for actuating said valve means to render said motor ineffective to disengage said clutch means when the accelerator is released.

8. In a motor vehicle, a drive shaft, a driven shaft, a flywheel on said drive shaft, a friction clutch disc slidably mounted on said driven shaft for rotation therewith, a pressure disc slidably and rotatably mounted on said driven shaft and adapted to engage said friction disc to move the same into driving engagement with said flywheel, yielding means for normally holding said discs and wheel in engagement, power means concentric with said discs for moving the same out of engagement, and adjustable means for determining the movement of said pressure disc by said power means.

9. In a motor vehicle, a clutch comprising driving and driven elements, a fluid pressure motor concentric with said elements and including a movable member, yielding means for normally holding said clutch elements in driving engagement, and means concentric with said elements and disconnected from but engageable by said movable member for moving one of said clutch elements to disengaged position, said last-named means being adjustable to determine the extent of the disengaging movement of said last-named clutch element.

10. In apparatus of the class described, a drive shaft, a driven shaft, clutch means for drivably connecting said shafts, yielding means for normally holding said clutch means in operative engagement, a non-rotatable fluid pressure motor surrounding said driven shaft for disengaging said clutch means, and valve means for controlling the pressure in said motor.

11. In a motor vehicle, a drive shaft, a driven shaft, clutch means for drivably connecting said shafts, yielding means for normally holding said clutch means in engaged position, power means including a movable member surrounding one of said shafts, and means disconnected from but adapted to engage said clutch means and said movable member whereby said clutch means may be disengaged.

12. In apparatus of the class described, a drive shaft, a driven shaft, clutch means adapted to drivably connect said shafts, yielding means for normally holding said clutch means in driving engagement, and power means coaxially disposed with respect to said clutch means for disengaging the same, said power means including a non-rotatable element surrounding one of said shafts and movable axially thereof.

13. In a motor vehicle, a drive shaft, a driven shaft, a flywheel on said drive shaft, a friction clutch disc slidably mounted on said driven shaft for rotation therewith, a pressure disc slidably and rotatably mounted on said driven shaft and adapted to engage said friction disc to move the same into driving engagement with said flywheel, yielding means for normally holding said discs and wheel in engagement, and power means for moving the same out of engagement, said power means comprising an annular fluid pressure motor surrounding one of said shafts.

14. In a motor vehicle having a drive shaft, a driven shaft, clutch means for drivably connecting said shafts, a throttle and brake mechanism, a control system comprising power means for disengaging said clutch means, power means for applying said brake mechanism, a common source of vacuum for energizing said power means, common valve means for controlling communication between said power means and said source, said valve means being operable in conjunction with said throttle, and other valve means interposed between the brake applying power means and said common valve means.

15. In a motor vehicle having a drive shaft, a driven shaft, clutch means for drivably connecting said shafts, and brake mechanism, a control system comprising power means for disengaging said clutch means, power means for applying said brake mechanism, common means for energizing said power means, common valve means for controlling communication between said power means and said energizing means, and means for actuating said valve means for successively cutting off communication between said energizing means and said clutch and brake power means, whereby the brake applying power means is rendered ineffective above a predetermined throttle opening when the clutch means is engaged.

16. In apparatus of the class described, an internal combustion engine having a clutch, a fluid pressure motor for disengaging said clutch, means for cranking said engine, and connections including a movable element of said fluid pressure motor between said clutch and cranking means whereby the latter may be rendered operative to crank the engine only when the clutch is in disengaged position.

17. An automotive power plant comprising a throttle controlled internal combustion engine, a clutch and brake mechanism, power means for operating the clutch, power means for operating the brake mechanism, said power means having a valve in common, means interconnecting said valve and the engine throttle, and other valve means for controlling the operation of the brake operating power means.

18. In an automotive power plant comprising an internal combustion engine, a clutch and brake mechanism, power means for operating the clutch, power means for operating the brake mechanism, common valve means for controlling the fluid pressure in said power means, means for actuating said valve means, and other valve means for controlling the operation of the brake operating power means.

CHARLES A. BREWER.